United States Patent [19]

Murata et al.

[11] 4,260,248

[45] Apr. 7, 1981

[54] ELECTROPHOTOGRAPHIC COPYING APPARATUS EQUIPPED WITH COPYING COVERAGE INDICATION DEVICE

[75] Inventors: Tomoji Murata, Toyokawa; Kenji Shibazaki, Aichi; Kenichi Arai, Nakano; Tsuneo Kitagawa, Toyohashi, all of Japan

[73] Assignee: Minolta Camera Kabushiki Kaisha, Osaka, Japan

[21] Appl. No.: 18,052

[22] Filed: Mar. 6, 1979

[30] Foreign Application Priority Data

Mar. 9, 1978 [JP] Japan ................................ 53-27248

[51] Int. Cl.[3] ...................... G03G 15/00; G03B 27/52

[52] U.S. Cl. .................................. 355/60; 355/14 C; 355/75

[58] Field of Search .............................. 355/14, 55-63, 355/133, 3 R, 75, 76, 14 R, 14 C

[56] References Cited

U.S. PATENT DOCUMENTS

| | | | |
|---|---|---|---|
| 3,560,087 | 2/1971 | Washio et al. | 355/14 |
| 3,877,809 | 4/1975 | Suzuki et al. | 355/133 |

FOREIGN PATENT DOCUMENTS 81624 7/1976 Japan .

*Primary Examiner*—L. T. Hix
*Assistant Examiner*—W. J. Brady
*Attorney, Agent, or Firm*—Wenderoth, Lind & Ponack

[57] ABSTRACT

An electrophotographic copying apparatus is equipped with an indication device for the maximum area to be covered by copying, i.e. the area available for copying or copying coverage. The copying coverage indication device which includes a micro-computer is arranged to indicate the area to be covered by copying according to the sizes of copy paper sheets and copying magnifications for preventing use of copy paper sheets of unnecessarily large or small sizes, and is capable of warning an operator of the necessity for exchanging sizes of copy paper sheets.

9 Claims, 7 Drawing Figures

ELECTROPHOTOGRAPHIC COPYING APPARATUS EQUIPPED WITH COPYING COVERAGE INDICATION DEVICE

BACKGROUND OF THE INVENTION

The present invention relates to an electrophotographic copying apparatus and more particularly, to an electrophotographic copying apparatus equipped with a copying coverage indication device which indicates the maximum area to be covered by copying, i.e. the area vailable for copying or copying coverage, on an original platform of the electrophotographic copying apparatus capable of selectively using copy paper sheets of a plurality of different sizes and provided with a variable magnification function.

Generally, in electrophotographic copying apparatuses, it is so arranged that an original to be copied placed on a transparent platform is illuminated by a light source or exposure lamp from the under surface of the original so as to project the light-wise image reflected from the original onto a photosensitive member or photoreceptor through an optical system including a lens assembly, etc., and in the case of copying at a magnification of 1:1 or equal size magnification, since the area to be covered by copying with respect to the size of the selected copy paper sheets is the size of the copy paper sheet itself, an operator of the copying apparatus has only to align one edge of the original with a reference side or datum line given on the original platform to set the original within a range indicated by a size scale or the like provided along the reference side.

However, in an electrophotographic copying apparatus capable of selectively using copy paper sheets of a plurality of different sizes and also provided with a variable magnification function, the size of the copy paper sheet does not necessarily coincide with the area to be covered by the copying operation or the area available for copying, and it has been quite troublesome for the operator to select a copy paper sheet of optimum size based on the size of the original and the magnification for the copying or to judge the size of the original which can be used according to the selected copy paper sheet size and the copying magnification, thus frequently giving rise to such inconveniences as employing copy paper sheets of unnecessarily large size, or undesirably using copy paper sheets too small for the size of the copied images.

In the conventional copying apparatuses of this kind, determination of the copy paper sheet size or the area to be covered by copying has almost been left to the operator, and although some of the conventional copying apparatuses are arranged merely to indicate the maximum area to be covered by copying for each copying magnification by scales and the like, there has been no arrangement for indicating the area available for copying in relation with the copy paper sheet size, thus still imposing troubles as described above on the operators.

Meanwhile, no particular attention has yet been drawn to automatically effecting determinations as described above, since in such an automated arrangement, if many kinds of copy sheets are involved, with a variety of copying magnifications, extremely expensive and complicated mechanisms are inevitably required, and thus, the inconveniences on the part of the operators as described earlier have not at all been eliminated at the present stage.

SUMMARY OF THE INVENTION

Accordingly, an essential object of the present invention is to provide an electrophotographic copying apparatus equipped with a copying coverage indication device which is arranged to indicate the area to be covered by the copying operation, i.e., the area available for copying or copying coverage according to the size of copy paper sheets and copying magnifications for preventing use of copy paper sheets of unnecessarily large or small sizes.

Another important object of the present invention is to provide an electrophotographic copying apparatus equipped with a copying coverage indication device of the above described type which is capable of warning the operator of necessity for exchanging sizes of the copy paper sheets, if unsuitable magnification is selected with respect to copy paper sheet sizes.

A further object of the present invention is to provide an electrophotographic copying apparatus equipped with a copying coverage indication device of the above described type in which the indications as described in the foregoing are effected through utilization of memory and judging functions of a micro-computer employed for control of operations of the copying apparatus so that the foregoing objects of the invention are achieved without increased size and complication of the copying apparatus, even in an electrophotographic copying apparatus capable of selecting a variety of copy paper sheet sizes and copying magnifications.

A still further object of the present invention is to provide an electrophotographic copying apparatus equipped with a copying coverage indication device of the above described type which is simple in construction and accurate in functioning, and can be manufactured at low cost.

In accomplishing these and other objects, according to one preferred embodiment of the present invention, the electrophotographic copying apparatus which is provided with an original platform of transparent plate material, a scanning optical system which scans an original placed on the original platform while illuminating the original from the under surface of the original platform for directing a light-wise image of the original onto a photoreceptor, means for varying the scanning speed of the scanning optical system corresponding to various copying magnifications, and means for mounting copy paper which is capable of loading thereon a plurality of sizes of copy paper, further includes means for selecting the copying magnifications, means for detecting the magnifications and which emits signals respectively corresponding to the copying magnifications selected by the copying magnification selecting means, means for detecting sizes which detects the size of the copy paper loaded on the copy paper mounting means for emitting signals corresponding to the detected size, means for judging the area available for the copying operation and which receives signals from the magnification detecting means and said size detecting means for judging the area available for copying on a plane including the original platform, means for indicating the area available for the copying operation and which is selectively actuated corresponding to output of the available copying area judging means, and means for detecting when the area available for copying judged by the available copying area judging means has exceeded the actual area available for copying for the electrophotographic copying apparatus.

By the arrangement according to the present invention as described above, since the area to be covered by copying, i.e. the area available for copying or copying coverage, is clearly indicated according to the combinations of the copy paper sizes and copying magnifications, inconveniences inherent in the conventional arrangements such as use of a copy paper sheet unnecessarily large with respect to the original or employment of a copy paper sheet too small for the desired image are advantageously prevented. Moreover, owing to the arrangement to give warnings for copy paper size exchange if a copy paper sheet of unsuitable size is selected, wasteful use of the copy paper sheets are also eliminated.

BRIEF DESCRIPTION OF THE DRAWINGS

These and other objects and features of the present invention will become apparent from the following description of preferred embodiments thereof with reference to the accompanying drawings, in which.

Before the description of the present invention proceeds, it is to be noted that like parts are designated by like reference numerals throughout the several views of the accompanying drawings.

DETAILED DESCRIPTION OF THE INVENTION

Figure 1:
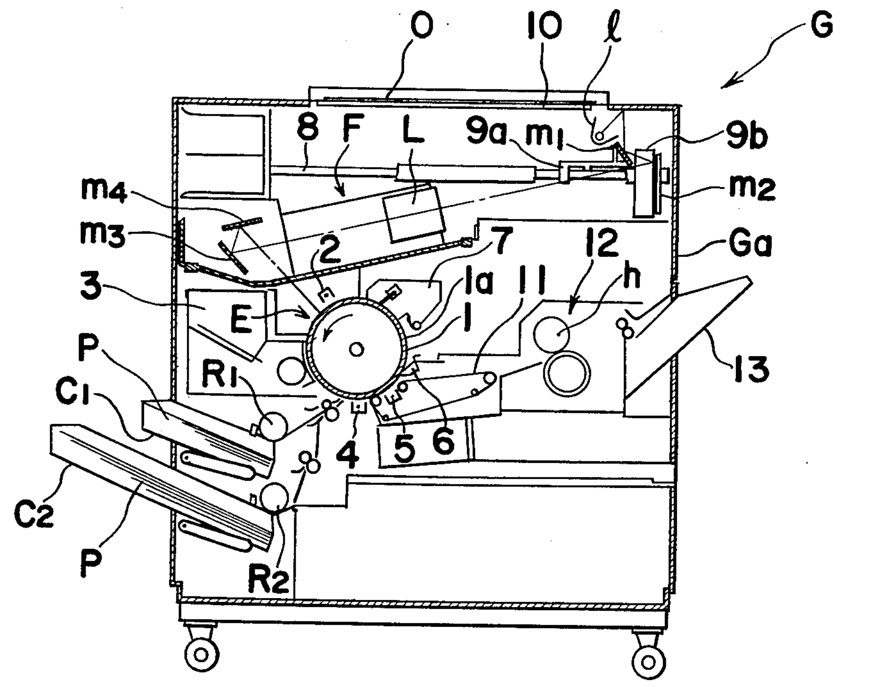
FIG. 1 is a schematic side sectional view of an electrophotographic copying apparatus in which a copying coverage indication device according to the present invention is incorporated.

Referring now to the drawings, there is shown in FIG. 1 an electrophotographic copying apparatus to which the copying coverage indication device directly related to the present invention may be applied.

In FIG. 1, the copying apparatus G generally includes an apparatus housing Ga of rectangular box-like configuration defined by walls, and a photosensitive member or photoreceptor drum 1 of known construction having a photoconductive photoreceptor surface 1*a* provided on the outer periphery thereof and rotatably disposed at approximately the central portion of the housing Ga for rotation in the direction of the arrow to cause the photoreceptor surface 1*a* to sequentially pass various processing stations disposed therearound for image formation, such as a charging station with a corona charger 2, an exposure station E, a developing station having a developing unit 3, a transfer station having a transfer charger 4, a charge erasing station provided with an AC discharger 5, a copy paper sheet separating station with a separating claw 6, a cleaning station having a cleaning unit 7, etc.

At the upper portion of the housing Ga, there is provided a platform 10 of light transmitting transparent material for placing an original O to be copied thereon, while below and adjacent to the platform 10, an optical system F including an exposure lamp l, first, second, third and fourth reflecting mirrors $m_1$, $m_2$, $m_3$ and $m_4$, lens assembly L, etc. is provided for directing a light-wise image of the original O onto the photoreceptor surface 1*a* at the exposure station E in a manner as described hereinbelow.

The exposure lamp l and the suitably inclined first reflecting mirror $m_1$ are fixedly mounted on a fixing member (not shown) which is secured to or integrally formed with a slider member 9*a* slidably mounted on a rail member 8 so as to be moved leftward by driving means (not shown) from the position shown in FIG. 1 in parallel relation with the platform 10 at a speed of V/M, wherein V represents the copy paper sheet transportation speed (speed of rotation of the photoreceptor drum 1) and M denotes the copying magnification. The second reflecting mirror $m_2$ is secured to another slider member 9*b* also slidably mounted on the rail 8 for being moved leftward in FIG. 1 by driving means (not shown) in synchronization with the movement of the exposure lamp l, etc. at a speed of V/2M, while the reflecting mirrors $m_3$ and $m_4$ are fixedly mounted to frames of the housing Ga and respectively inclined at predetermined angles to direct the light-wise image of the original toward the exposure station E onto the photoreceptor surface 1*a*.

The copying magnification is, for example, approximately 0.816 in the reduced scale or contraction copying through change-over of A row and B row of the copy paper sheet sizes, and approximately 0.707 in the case of reduced scale copying at an area ratio of ½. Meanwhile, the changeover of the speeds as described in the foregoing may be achieved by means of changing over of clutch means (not shown) through a suitable copying magnification selecting operation, variation of gear ratios, etc.

It is to be noted here that the expressions such as A row and B row employed throughout the present specification for denoting paper sizes are based on Japanese Industrial Standards (JIS), in which the paper sizes are represented both for the A row and B row in the order from larger size to smaller size in such a manner as A0 (A zero), A1, A2, . . . , A12, and B0 (B zero), B1, B2, . . . , B12, etc. Specific paper sizes for respective symbols are given in Table 1 below.

TABLE 1

| | Finished dimensions by JIS Standards | | |
|---|---|---|---|
| A row No. | Unit (mm) | B row No. | Unit (mm) |
| 0 | 841 × 1 189 | 0 | 1 030 × 1 456 |
| 1 | 594 × 841 | 1 | 728 × 1 030 |
| 2 | 420 × 594 | 2 | 515 × 728 |
| 3 | 297 × 420 | 3 | 364 × 515 |
| 4 | 210 × 297 | 4 | 257 × 364 |
| 5 | 148 × 210 | 5 | 182 × 257 |
| 6 | 105 × 148 | 6 | 128 × 182 |
| 7 | 74 × 105 | 7 | 91 × 128 |
| 8 | 52 × 74 | 8 | 64 × 91 |
| 9 | 37 × 52 | 9 | 45 × 64 |
| 10 | 26 × 37 | 10 | 32 × 45 |
| 11 | 18 × 26 | 11 | 22 × 32 |

TABLE 1-continued

| | Finished dimensions by JIS Standards | | |
|---|---|---|---|
| A row No. | Unit (mm) | B row No. | Unit (mm) |
| 12 | 13 × 18 | 12 | 16 × 22 |

The light-wise image of the original O scanned by the optical system F is projected onto the photoreceptor surface 1*a* of the rotating photoreceptor drum 1 at the exposure station E in the manner as described earlier to form thereon an electrostatic latent image, which is then developed into a visible toner image by the developing device 3 for being subsequently transferred by the transfer charger 4 onto a copy paper sheet P transported in synchronization with the proceeding of the development, and thereafter, the copy paper sheet P bearing the visible toner image thus transferred thereon is separated from the photoreceptor surface 1*a* by means of the AC discharger 5, separating claw 6, etc. so as to be further transported, through a transportation belt 11 movably supported by a plurality of rollers in a position subsequent to the transfer charger 4, to a fixing device 12 including a heat roller h for fixing the visible toner image onto the copy paper sheet P by heating, and then, the copy paper sheet bearing the copied image is discharged onto a tray 13 for completion of one copying cycle.

For making it possible to simultaneously stock, for example, two different sizes of copy paper sheets P, the copying apparatus G is provided, at the lower left portion of the housing Ga, with two copy paper sheet containers or cassettes $C_1$ and $C_2$ in which stacks of the copy paper sheets P of different sizes are respectively accommodated, and by selectively operating copy paper sheet feeding rollers $R_1$ and $R_2$ provided in positions corresponding to the cassettes $C_1$ and $C_2$ by suitable means (not shown), either one of the copy paper sheets P contained in the cassette $C_1$ or $C_2$ is fed one by one from the top of the stack of the copy paper sheets P toward the transfer station through corresponding guide plates and feeding rollers.

Figure 2:
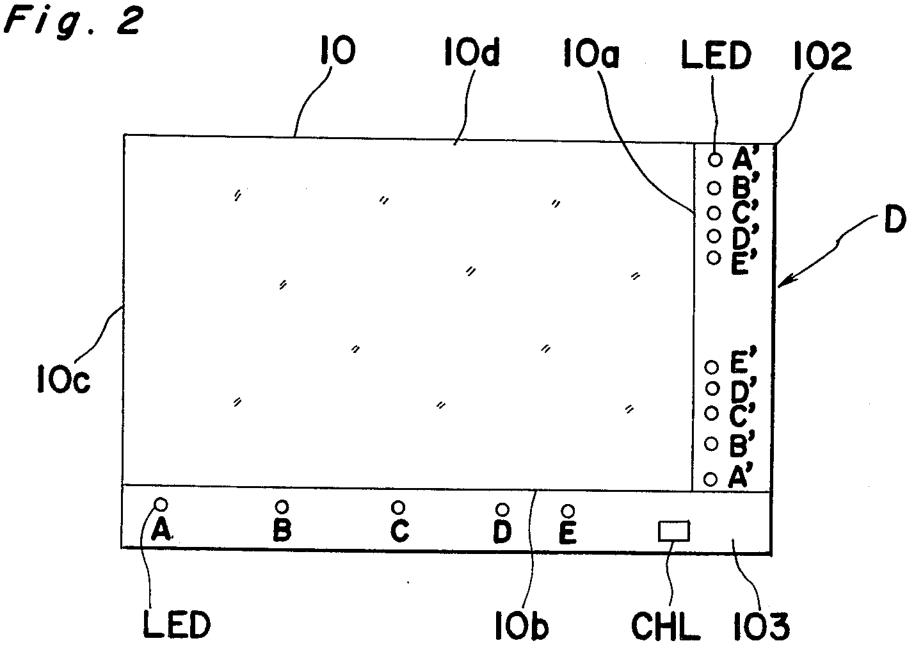
FIG. 2 is a top plan view showing, on an enlarged scale, an original platform having a copying coverage indication device and employed in the copying apparatus of FIG. 1.

Referring to FIG. 2, the copying coverage indication device D for indicating the area to be covered by the copying operation, i.e. available copying area or copying coverage, directly related to the present invention and incorporated in the electrophotographic copying apparatus G of FIG. 1 will be explained hereinbelow.

In FIG. 2, the copying coverage indication device D generally includes indicator sections 102 and 103 respectively provided adjacent to neighboring two sides 10*a* and 10*b* of the original platform 10 and having indicator lamps, for example, light emitting diodes (LED) arranged in positions corresponding to the sizes of the copy paper sheet which may be employed for the copying operation so as to indicate the area to be covered by the intended copying operation by illumination of the light emitting diodes LED. For the above purpose, for example, the positions of the light emitting diodes LED arranged on the indicating section 103 adjacent to the side 10*b* of the original platform 10 are designated as A, B, C, D and E from the side 10*c* opposite to the datum side 10*a* toward side 10*a* for respectively representing lengths in the longitudinal direction from the datum side 10*a* for A3 size by the LED at A, B4 size by B, A4 size by C, B5 size by D and so on, while in the indicating section 102, light emitting diodes are symmetrically arranged in pairs with respect to the central portion of the datum side 10*a* in positions A', B', C', D' and E' from the side 10*b* and side 10*d* opposite thereto, toward the central portion of the datum side 10*a* as shown for indicating the positions in the widthwise direction of the copy paper sheets in correspondence with the longitudinal lengths A, B, C, D and E mentioned above in the indicator section 103. By the above arrangement, the area to be covered by the particular copying operation, i.e. the available copying area or copying coverage, is clearly indicated through combinations of illuminated light emitting diodes LED at the respective positions mentioned above.

Figure 3:
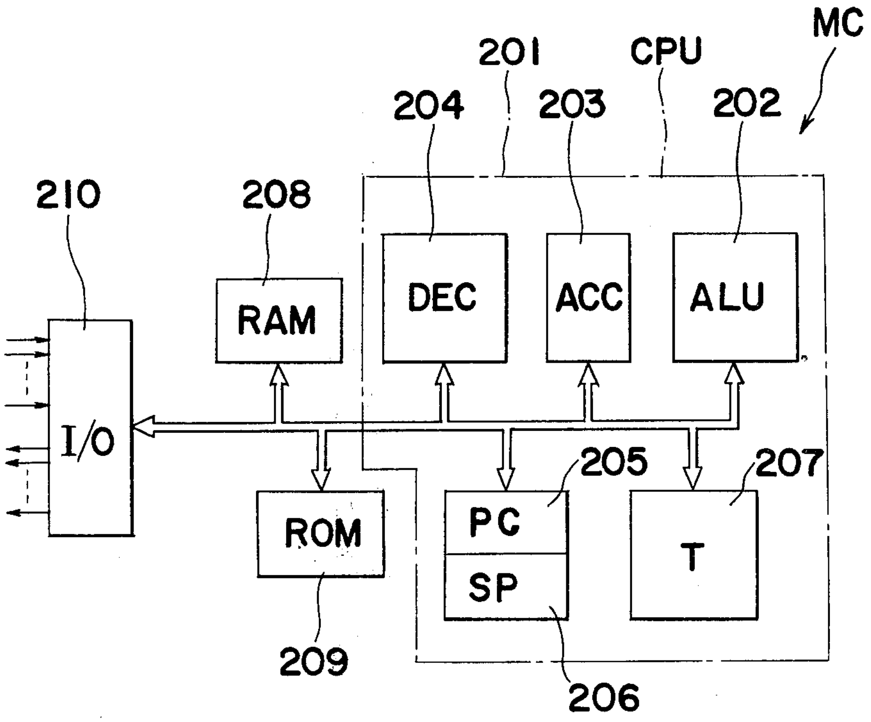
FIG. 3 is an electrical block diagram showing construction of a micro-computer employed for controlling operations of the copying apparatus of FIG. 1.
Figure 4:
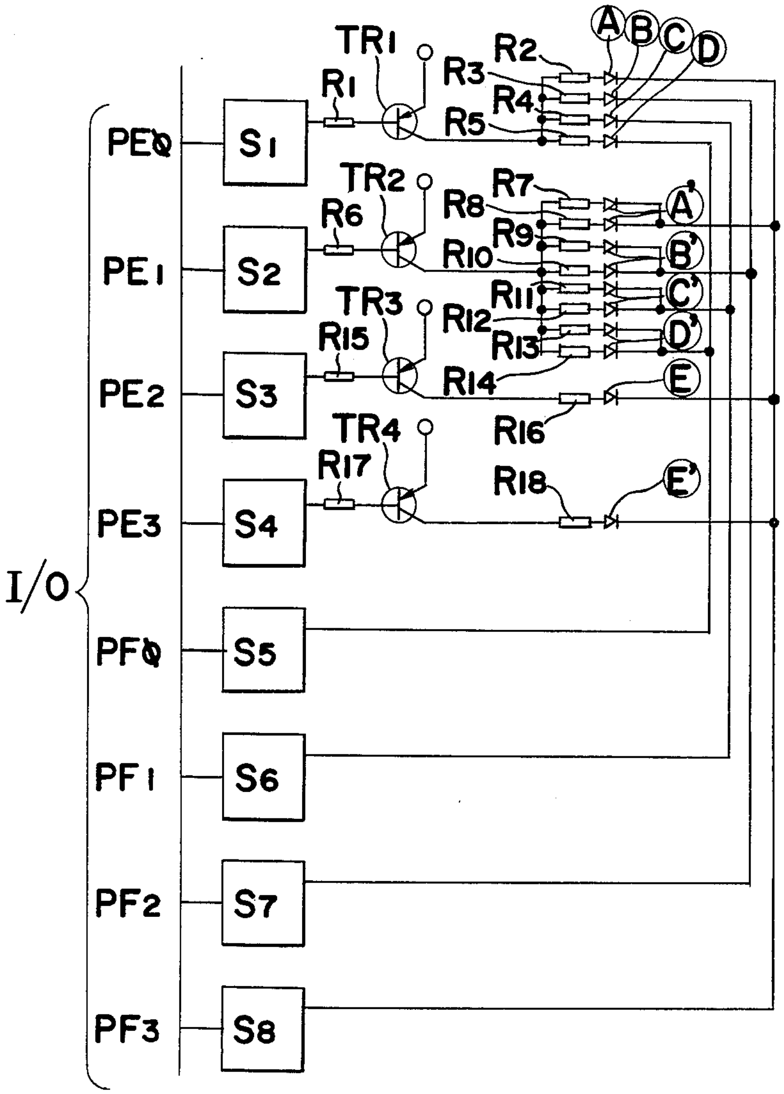
FIG. 4 is a diagram the relation between the indication circuit and the micro-computer.

Reference is had to FIGS. 3 and 4 showing an electrical circuit arrangement for causing the light emitting diodes LED to be selectively illuminated according to the size of a selected copy paper sheet and copying magnification so as to indicate the copying coverage. It is to be noted that in the embodiment of FIGS. 3 and 4, the control as mentioned above is arranged to be effected through utilization of memory and decision functions of a micro-computer MC, for example, a μCOM 43 (name used in the trade and manufactured by Nippon Electric Co., Ltd.) which is used for sequence control, etc. of the function of the copying apparatus G.

The micro-computer MC of FIG. 3 includes a central processing unit (CPU) 201 in which an arithmetic and logic unit (ALU) 202, an accumulator (ACC) 203, an instruction decoder (DEC) 204, a program counter (PC) 205, a stack pointer (SP) 206, a timer (T) 207 and the like are integrated, and one or a plurality of large scale integrated circuits LSI having random access memory (RAM) 208 and read only memory (ROM) 209, etc., based on fundamental construction of a semiconductor memory cell for receiving signals from external circuits and also for emitting control signals therefrom through an input/output interface I/O 210 in a known manner. Since the functions of the micro-computer MC as described above for the sequence control of the operations for the copying apparatus G of FIG. 1 are not directly related to the present invention, the detail description thereof provided herein is abbreviated.

According to the present invention, detection signals from copy paper sheet size detection means and copying magnification detection means to be described later are applied to the micro-computer MC through an input port of the input/output interface I/O 210, and according to the program memorized in ROM 209, control signals are output from output ports of the interface I/O 210 into an indication circuit as shown in FIG. 4 for illuminating corresponding light emitting diodes LED.

In FIG. 4, eight outputs in total from the output ports PEφ, PE1, PE2 and PE3, and PFφ, PF1, PF2 and PF3 coupled to corresponding switching circuits $S_1$, $S_2$, $S_3$, $S_4$, $S_5$, $S_6$, $S_7$ and $S_8$ as shown are used for the illumination control of the above described emitting diodes LED. The outputs are first applied to the switching circuits $S_1$ to $S_8$ for turning ON or rendering conductive only those of the switching circuits $S_1$ to $S_8$ which actually receive the output signals. The switching circuit $S_1$ is connected to the base of a transistor $TR_1$ through a resistor $R_1$, while light emitting diodes LED-A, LED-B, LED-C and LED-D are coupled, through corresponding resistors $R_2$, $R_3$, $R_4$ and $R_5$, to the collector of the transistor $TR_1$, with light emitting diodes LED-A, LED-B, LED-C and LED-D being further coupled to the switching circuits $S_8$, $S_7$, $S_6$ and $S_5$ respectively. The switching circuit $S_2$ is connected, through a resistor $R_6$, to the base of a transistor $TR_2$ whose collector is connected to the light emitting diodes LED-A′, LED-B′, LED-C′ and LED-D′ each in pair, which are further coupled to the switching circuits $S_8$, $S_7$, $S_6$ and $S_5$ respectively. Meanwhile, the switching circuit $S_3$ is connected through a resistor $R_{15}$, to the base of a transistor $TR_3$ whose collector is coupled through a resistor $R_{16}$ to the light emitting diode LED-E which is further connected to the switching circuit $S_8$. The switching circuit $S_4$ is connected through a resistor $R_{17}$ to the base of a transistor $TR_4$ whose collector is coupled through a resistor $R_{18}$, to the light emitting diode LED-E′ which is further connected to the switching circuit $S_8$.

Referring also to a flow-chart of FIG. 5, the function and control of the circuit as described in the foregoing will be subsequently explained with reference to a case where copy paper sheets of A4 size are accommodated sidewise or laterally in the copy paper sheet cassette.

Upon application of power supply to the copying apparatus G of FIG. 1, a power source (not shown) for the micro-computer MC as described in the foregoing is simultaneously turned ON for causing the micro-computer MC to start functioning. In the first place, at a step ① in FIG. 5, the presence of copy paper sheets in the cassette is detected by copy paper sheet size detection means, and if the cassette is not fully loaded or is empty of copy paper sheets, a paper empty indication at a step ② is given, while on the contrary, if the cassette is fully loaded, a subsequent size judging step ③ is entered, whereat a signal decided for each size through the interface input ports mentioned earlier is stored in the random access memory RAM 208 based on detecting signal from size detection means to be described later.

Subsequently, at a next step ④ , the copying magnification is detected by the position of the lens assembly L (FIG. 1) which moves following the selection of the copying magnifications, so as to be also stored in the random access memory RAM 208 and memorized in the read only memory ROM 209. The content of the memory temporarily stored in the accumulator ACC 203 according to the program is compared with the above content stored in the random access memory RAM 208 for initiating the subsequent function.

By way of example, on the assumption that the copying apparatus as described above has three kinds of copying magnifications, i.e. equal size magnification, 0.816 power reduced scale magnification (contraction A) and 0.707 power reduced scale magnification (contraction B), judgement is made as to whether the lens assembly L is located in the contraction A (step ⑤ ) or in the contraction B (step ⑥ ), and if the lens assembly L is not present either in the position for the contraction A or in the position for the contraction B, a program at step ⑦ for the equal size magnification is executed.

If the copy paper sheets detected are of A4 size directed sidewise, with the lens assembly L being at the position for the contraction A, the program at step ⑤ produces 1 at the output ports PE1 and PF3 of the interface I/O 210, i.e. generates outputs from such output ports. Accordingly, the switching circuits $S_2$ and $S_8$ are turned ON to illuminate the light emitting diode LED-A′. Similarly, outputs are also produced from the output ports PEφ and PFφ for turning ON the switching circuits $S_1$ and $S_5$, with consequent illumination of the light emitting diode LED-D.

The above indications show that when copy paper sheets of A4 size directed sidewise are employed, an original accommodated in the area indicated by the light emitting diodes LED-A′ and LED-D may be copied, but since the copy paper sheets of A4 size are directed sidewise, the actual area to be covered by the copying ought to be larger than that indicated by the light emitting diode LED-A′. Accordingly, the copy paper size thus indicated is improper for the reduced scale copying and therefore, a size exchange indication is turned ON at a step ⑧ , together with the illumination of the light emitting diodes LED-A′ and LED-D as described above. The size exchange indication may be suitably made in the indicating section 103, for example, by illumination of a lamp CHL (FIG. 2) or the like.

In a manner similar to that described above, when the contraction B is selected, with the step ⑥ being executed, the light emitting diodes LED-A′ and LED-C are lit, and the size exchange indication is simultaneously turned ON. In the case of the equal size magnification at a step ⑦ , since it is not necessary to indicate the size exchange, only the lateral positioning of the A4 size copy paper sheets is indicated by the light emitting diodes LED-A′ and LED-E. Meanwhile, before the judgement of the copying magnification, a detection is made as to whether a paper size indication switch (not shown) is turned ON or not at a step ⑨. The paper size indication switch is arranged to be depressed by an operator for indication of the actual size of the copy paper sheet ready for use at the time on the indication device D, and upon depression thereof, the program at the step ⑦ for the equal size magnification is directly executed without entering the copying magnification judging step, and the copy paper sheet size detected is indicated irrespective of the copying magnifications.

Figure 5:
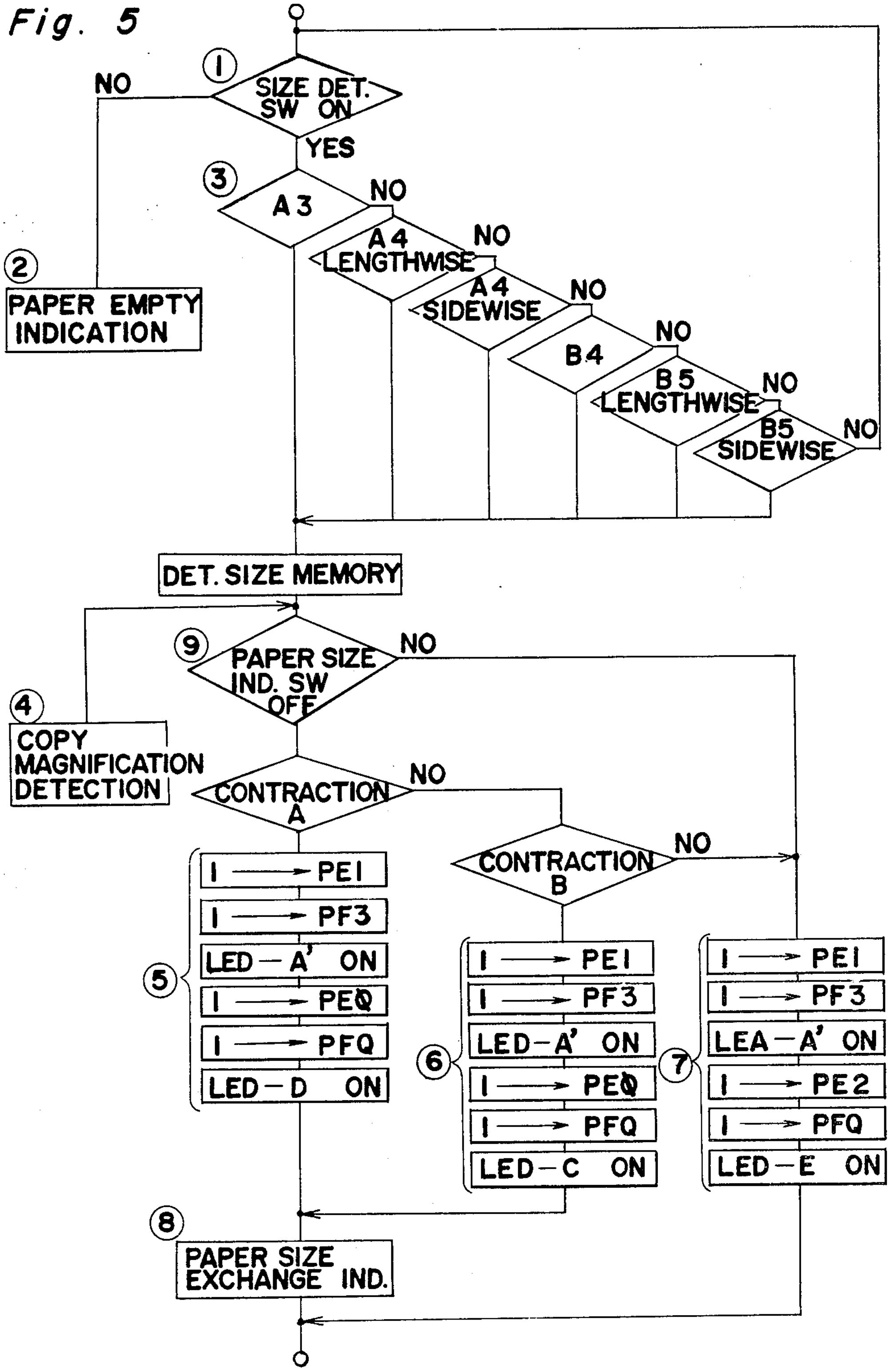
FIG. 5 is a flow-chart explanatory of the sequence of processes in the micro-computer.

In the flow-chart of FIG. 5 illustrating one example wherein the copy paper sheet of A4 size is loaded sidewise or laterally in the copying apparatus, the state of illumination of the light emitting diodes according to the combinations of the copy paper sheet sizes and copying magnifications is shown in Table 2 below.

TABLE 2

| | 1<br>φφφ1 φφ1φ | 2<br>φφ11 | 3<br>φ1φφ | 4<br>φ1φ1 | 5<br>φ11φ | 6<br>φ111 | 7 |
|---|---|---|---|---|---|---|---|
| size | A3 | A4 lengthwise | A4 sidewise | OP | B4 | B5 lengthwise | B5 sidewise |
| | AA′ | CC′ | EA′ | | BB′ | DD′ | EB′ |
| × 1.0 | 420 × 297 | 297 × 210 | 210 × 297 | OP | 364 × 257 | 257 × 182 | 182 × 257 |
| | (AA′) | BB′ | (DA′) | | AA′ | CC′ | EA′ |
| × 0.816 | 514 × 364 | 364 × 257 | 257 × 364 | OP | 446 × 315 | 315 × 223 | 223 × 315 |
| | (AA′) | AA′ | (CA′) | | (AA′) | BB′ | (DA′) |
| × 0.707 | 594 × 420 | 420 × 297 | 297 × 420 | OP | 514 × 364 | 364 × 257 | 257 × 364 |

When it is so arranged that the copy paper sheet sizes of A3, A4 directed lengthwise, A4 directed sidewise, B4, B5 directed lengthwise and B5 directed sidewise are employed for copying, these copy paper sheet sizes are respectively converted into codes ϕϕϕ1, ϕϕ1ϕ, ϕϕ11, ϕ1ϕϕ, ϕ1ϕ1, ϕ11ϕ and ϕ111 as shown in Table 2 upon detection by the size detection means so as to be input to the random access memory RAM 208. It is to be noted that the code 4 ϕ1ϕϕ is for an optional purpose. In Table 2, the light emitting diodes LED to be illuminated according to the respective copy paper sheet sizes and copying magnifications are merely represented by the alphabetical symbols A to D and A′ to D′, while those for which the size exchange indication is turned ON are surrounded by circles. The figures given below the alphabetical symbols denote the calculated values in milli-meter (mm) for the areas that can actually be utilized for the copying operations. In the above case, since the reduction of 0.816 power is employed for contraction from the A row to B row in the illustrated embodiment, numerical errors to a certain extent are involved during change-over from the B row to A row.

Although detailed description of individual functions of the circuit of FIG. 4 other than those illustrated in the flow-chart of FIG. 5 are abbreviated here for brevity, it is to be noted the arrangement is such that the emitter voltage (+12 V) of the transistors $TR_1$ to $TR_4$ is applied to the light emitting diodes LED via the switching circuits $S_1$ to $S_4$ so as to determine the light emitting diodes LED to be illuminated by forming current paths from the voltage source through turning ON and OFF of the switching circuits $S_5$ to $S_8$. It should also be noted here that when the size exchange indication is effected as described in the foregoing, the circuit may be arranged to control the copying operation to be suspended, but the arrangement may be so made as to permit a copying operation itself by merely effecting the size exchange indication, with subsequent treatments left to the operator.

Hereinbelow, the copy paper sheet size detection means and copying magnification detection means which apply inputs to the judging process mentioned above will be described with reference to FIG. 6.

Figure 6:
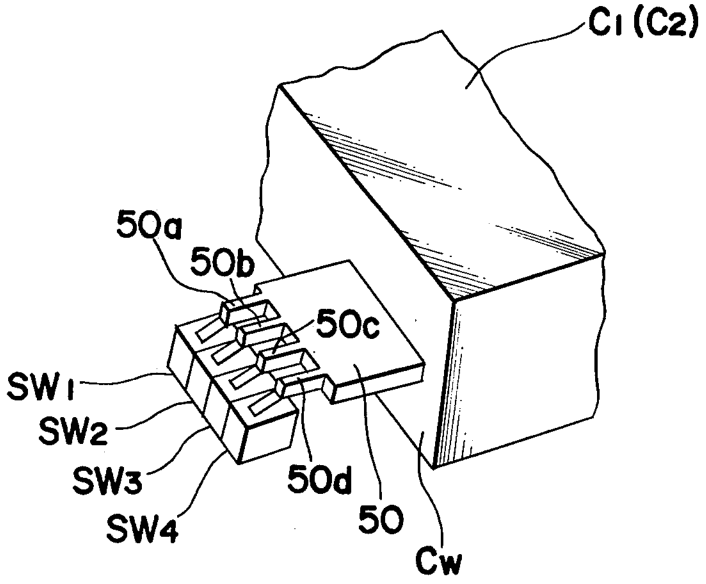
FIG. 6 is a fragmentary perspective view showing, on an enlarged scale, one example of a copy paper size detecting means which may be employed in the arrangement of FIG. 1.

In the copy paper size detection means for identification of the copy paper sizes, for example, the copy paper sheet cassettes $C_1$ and $C_2$ exclusive for corresponding copy paper sheet sizes are employed, while an actuator member 50 having a plurality of projections, for example, four projections 50*a*, 50*b*, 50*c* and 50*d* is provided on each of the cassettes $C_1$ and $C_2$ so as to extend outwardly from one side wall Cw thereof as shown in FIG. 6, and during loading of the cassettes $C_1$ and $C_2$ onto the copying apparatus, the projections 50*a* to 50*d* are adapted to selectively actuate corresponding microswitches $SW_1$, $SW_2$, $SW_3$ and $SW_4$ provided on the side of the apparatus housing Ga (FIG. 1) for the sizing judgement. Therefore, for example, when the four projections 50*a* to 50*d* are provided as shown in FIG. 6, since the microswitches $SW_1$ to $SW_4$ are all turned ON, the judging codes are 1111, and by converting into signals of ϕ and 1 according to the presence of the projections 50, judgements corresponding to the sizes may be effected as shown in Table 2.

It is to be noted that in Table 2, since the number of size judgements is six, the number of the projections 50 may be three, but for general use of the micro-computer MC, a four bit arrangement is shown in the illustrated embodiment, in which sixteen judgements are made possible including the code ϕϕϕϕ in the absence of copy paper sheets and the code ϕ1ϕϕ for the optional purpose.

It should also be noted that, for the size detection means according to each of the copy paper sheet cassettes, various modifications, for example, means for converting optically detectable markings printed on the cassettes in white, black, etc. into electrical signals by a photoelectric transducer element, means composed of a combination of magnet and lead switch, etc. are considered to be employable. Moreover, it may be so arranged that, in the absence of copy paper sheets in the cassettes loaded in the copying apparatus, the signal for ϕϕϕϕ is emitted, by providing, apart from the copy paper size detection means mentioned above, means for detecting the presence of the copy paper sheets including, for example, a light transmitting opening formed at a predetermined position of the cassette together with light emitting and light receiving elements.

Figure 7:
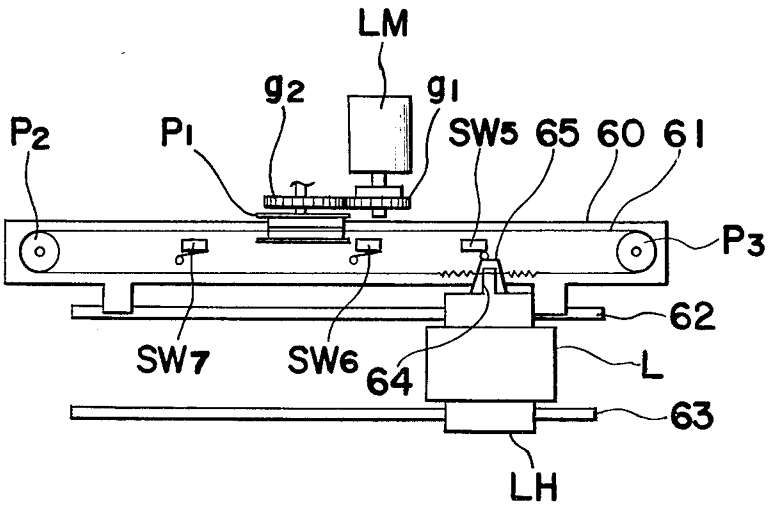
FIG. 7 is a schematic side elevational view showing, on an enlarged scale, one example of the structure of a lens assembly moving means for detection and alteration of copying magnifications which may be incorporated in the arrangement of FIG. 1.

Referring to FIG. 7, the copying magnification detection means is so arranged as to obtain the predetermined signals through detection of displacement of the lens assembly L following alteration of the magnifications. More specifically, simultaneously with the change-over of the driving speeds for the exposure lamp l, reflecting mirrors $m_1$ and $m_2$, etc. following a suitable magnification change-over operation as described earlier, the lens assembly L is also moved to a predetermined position, at which time, the position of the lens assembly L is detected through microswitches $SW_5$, $SW_6$ and $SW_7$ to be actuated as the lens assembly L is moved, and the signals obtained by the above detection are converted into predetermined magnification signals so as to be input to the random access memory RAM 208 through the interface I/O 210 mentioned earlier.

In the driving mechanism for the lens assembly L shown in FIG. 7, the driving force of a motor LM is transmitted to a pully $P_1$ through gears $g_1$ and $g_2$ meshing with each other for moving a lens holder LH through movement of a lens assembly moving wire 61 passed around the pulley $P_1$, and pulleys $P_2$ and $P_3$ rotatably provided adjacent to opposite ends of a base 60. The lens holder LH is slidably mounted on rails 62 and 63, while opposite ends of the wire 61 are connected to a projection or pin 64 integrally formed or rigidly secured to the lens holder LH. The lens holder LH is further provided with a switch actuating portion 65 so as to contact actuators of the microswitches $SW_5$, $SW_6$ and $SW_7$ arranged at predetermined positions on the base 60 for actuating predetermined ones of the microswitches $SW_5$ to $SW_7$ to emit a lens assembly stopping signal and also a signal corresponding to each of the copying magnifications.

The microswitches $SW_5$ to $SW_7$ are respectively disposed at the predetermined positions corresponding to the equal size magnification, contraction A and contraction B, which positions are optically determined based on the locations of the lens assembly L according to the copying magnifications.

Although not particularly shown in the drawings, the copying magnification signal produced by the functioning of the respective microswitches $SW_5$ to $SW_7$ are formed into codes for each copying magnification through a suitable signal converting means (not shown) so as to be input to the random access memory RAM 208 mentioned earlier.

It is to be noted here that, since some changeover operation is effected during the selection of the copying magnifications to be made by the operator, the signal obtained in the above case may be directly utilized as a copying magnification detection signal.

It should also be noted that as is seen from the foregoing description, in the arrangement according to the present invention, the area to be covered by the copying operation or the area available for the copying operation is indicated on the original platform based on the size and copying magnification of the copy paper sheets ready for copying, and that the specific indication circuit, use of the micro-computer, programming thereof, detecting means for the copy paper sheet sizes and copying magnifications, etc. disclosed in the above embodiment may further be modified in various ways within the technical concept of the present invention.

It should further be noted that although the foregoing embodiment has been mainly described with reference to the case of equal size magnification and reduced scale copying, the indication of the area available for the copying operation is also required in the case of a copying apparatus provided with an enlarging function (for example, at 1.414 power, i.e., approximately two power in area ratio), and that the present invention is also applicable to such enlargement. For example, the fact that an original of A4 size can not be used for the copy paper sheet of B4 size in the above copying magnification may be indicated by the indication of the area available for the copying operation or copying coverage at the indicating portion.

As is clear from the foregoing description, according to the indication device of the present invention, through clear indication of the area available for the copying operation or copying coverage by the combinations of the copy paper sheet sizes and copying magnifications, which has conventionally been troublesome and difficult for the operators to determine, inconveniences such as use of a copy paper sheet unnecessarily large with respect to the original or employment of a copy paper sheet too small for the desired image are advantageously prevented, and furthermore, since it is possible to give instructions for copy paper size exchange if a copy paper sheet of unsuitable size is selected, wasteful use of the copy paper sheets is eliminated. Moreover, when the control as described above is arranged to be effected within the range of memorizing capacity of the micro-computer employed for the sequence control of the copying apparatus, accurate indication control may be effected without increase of the size of the copying apparatus or complication of the circuit due to the control mechanisms even when many kinds of copy paper sheet sizes and copying magnifications are involved.

Although the present invention has been fully described by way of example with reference to the accompanying drawings, it is to be noted that various changes and modifications are apparent to those skilled in the art. Therefore, unless otherwise such changes and modifications depart from the scope of the present invention, they should be construed as included therein.

What is claimed is:

1. In an electrophotographic copying apparatus which includes an original platform of transparent plate material, a scanning optical system which scans an original placed on said original platform while illuminating the original from the under face of said original platform for directing a lightwise image of said original onto a photoreceptor, means for varying the scanning speed of said scanning optical system corresponding to various different copying magnifications, and copy paper mounting means which is capable of loading thereon a plurality of different sizes of copy paper, the improvement comprising:

(a) means for selecting a desired one of said various copying magnifications;

(b) magnification detecting means for detecting the said magnification selected by said copying magnification selecting means and for emitting a signal representative thereof;

(c) size detecting means for detecting the size of the copy paper loaded on said copy paper mounting means and for emitting a signal representative thereof;

(d) area judging means for receiving said signals from said magnification detecting means and said size detecting means, for judging, based on said signals, the area available on a plane including said original platform for imaging an original to form a copy on said detected size copy paper, and for generating an output representative thereof;

(e) indication means for indicating adjacent said original platform said judged area available for copying as a function of said output of said area judging means; and (f) means for detecting the existence of a condition such that said judged area available for copying, as judged by said area judging means, has exceeded the actual area of said original platform within said plane available for copying and such that copying of an original placed on said actual area of said original platform would result in a copy being formed on only a portion of said detected size copy paper and for generating an indication representative of said condition.

2. The improvement claimed in claim 1, wherein said scanning optical system includes a lens assembly at least movable corresponding to said various copying magnifications, and said magnification detecting means includes switching means for detecting movement of said lens assembly.

3. The improvement claimed in claim 1, wherein said copy paper comprises copy paper sheets held in a stacked state in cassette means which is to be loaded on said copy paper mounting means, and said size detecting means includes identification means provided on said cassette means to respectively correspond to said different sizes of the copy paper sheets and switching means on said copy paper mounting means for detecting the presence of particular of said identification means.

4. The improvement claimed in claim 1, wherein said area judging means comprises a micro-computer incorporated in said electrophotographic copying apparatus for effecting sequence control thereof, said micro-computer having functions of memorizing and judging said area available for copying by receiving said signals from said magnification detecting means and said size detecting means.

5. The improvement claimed in claim 1, wherein said indication means comprises a plurality of light emitting means arranged around said original platform in both the widthwise and lengthwise directions thereof.

6. The improvement claimed in claim 1, wherein said size detecting means further includes means for detecting the absence of said copy paper in said copy paper mounting means and for generating an empty signal representative thereof, and said area judging means comprises means, operable upon the absence of an empty signal and upon the presence of a signal indicating the size of detected copy paper from said size detecting means, and operable upon the presence of said signal representative of said selected copying magnification from said magnification detecting means for alternately selecting from among a plurality of predetermined programs a particular predetermined program representative of said signals, and for generating said output as a predetermined judging signal representative of said selected program.

7. In an electrophotographic copying apparatus which includes an original platform of transparent plate material, a scanning optical system which scans an original placed on said original platform while illuminating the original from the under face of said original platform for directing a light-wise image of said original onto a photoreceptor, copy paper mounting means which is capable of loading thereon a plurality of different sizes of copy paper, means for selecting a desired one of various copying magnifications, means for feeding a selected size of copy paper loaded on said copy paper mounting means therefrom, means for driving said scanning optical system, said photoreceptor and said copy paper feeding means, and a micro-computer having a program for controlling at least the functions of said scanning optical system, said photoreceptor, said copying magnification selecting means and said copy paper feeding means, said micro-computer having electrical circuitry for controlling said program through an interface, the improvement comprising:

(a) magnification detecting means for detecting the said copying magnification selected by said copying magnification selecting means and for emitting a signal representative thereof;

(b) size detecting means for detecting the size of the copy paper loaded on said copy paper mounting means and for emitting a signal representative thereof;

(c) means, provided in said micro-computer and receiving said size detection and copying magnification signals as inputs, for judging the selected copy paper size and copying magnification corresponding to the detected copy paper size and copying magnification based on said size detection and copying magnification detection signals and for generating an output representative thereof;

(d) memory means, provided in said micro-computer, for memorizing the area available on a plane including said original platform, from among various combinations of copy paper sizes and copying magnifications, for imaging an original to form a copy on said detected size copy paper, solely determined by said output from said judging means;

(e) indication means arranged around said original platform and coupled to said micro-computer so as to be controlled for functioning by the output of said micro-computer;

(f) means for selectively actuating said indication means in correspondence with the content of said memory means solely selected by the judged copy paper size and copying magnification from said judging means and for indicating said available area; and (g) means, actuated by said micro-computer including said memory means, for detecting the existence of a condition of an improper combination of said judged copy paper size and copying magnification such that the available copying area determined by the judged copy paper size and copying magnification exceeds the actual area of said original platform within said plane available for copying and such that copying of an original on said actual area of said original platform would result in a copy being formed on only a portion of said detected size copy paper, and for generating an indication of said condition.

8. The improvement claimed in claim 7, wherein said micro-computer comprises a one chip micro-computer which includes a central processing unit having integrated therein an arithmetic and logic unit, an accumulator, an instruction decoder, a program counter, a stack pointer, a timer and the like, and at least one large scale integrated circuit having random access memory and read only memory based on fumdamental construction of a semiconductor memory cell.

9. The improvement claimed in claim 7, wherein said size detecting means further includes means for detecting the absence of said copy paper in said copy paper mounting means and for generating an empty signal representative thereof, and said judging means comprises means, operable upon the absence of an empty signal and upon the presence of a signal indicating the size of detected copy paper from said size detecting means, and operable upon the presence of said signal representative of said selected copying magnification from said magnification detecting means, for alternately selecting from among a plurality of predetermined programs a particular predetermined program representative of said signals, and for generating said output as a predetermined judging signal representative of said selected program.

* * * * *